(12) United States Patent
Holt (10) Patent No.: US 8,528,429 B2
(45) Date of Patent: Sep. 10, 2013

(54) SYSTEM AND METHOD FOR STABILIZING A SENSOR

(75) Inventor: Mark Wayne Holt, Emmaus, PA (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 385 days.

(21) Appl. No.: 12/690,744

(22) Filed: Jan. 20, 2010

(65) Prior Publication Data

US 2011/0174053 A1 Jul. 21, 2011

(51) Int. Cl.
  *G01D 21/00* (2006.01)
  *G01N 23/00* (2006.01)
(52) U.S. Cl.
  USPC ............................................. 73/866.5; 74/5.5
(58) Field of Classification Search
  USPC ........................................... 73/866.5; 74/5.5
  See application file for complete search history.

(56) References Cited

U.S. PATENT DOCUMENTS

| | | | |
|---|---|---|---|
| 4,245,498 A * | 1/1981 | Poquette, Jr. ............... 73/152.54 |
| 4,364,226 A * | 12/1982 | Croset et al. ..................... 60/276 |
| 4,544,041 A * | 10/1985 | Rinaldi ............................ 175/57 |
| 4,989,466 A * | 2/1991 | Goodman ....................... 74/5.22 |
| 5,568,722 A | 10/1996 | Brunner et al. |
| 5,818,353 A * | 10/1998 | Eaton et al. .............. 340/870.01 |
| 6,075,611 A * | 6/2000 | Dussan V. et al. ............. 356/432 |
| 6,304,692 B1 | 10/2001 | Sappey et al. |
| 6,400,509 B1 | 6/2002 | Sappey et al. |
| 6,415,080 B1 | 7/2002 | Sappey et al. |
| 6,421,479 B1 | 7/2002 | Harr |
| 6,421,481 B1 | 7/2002 | Sappey |
| 6,598,492 B1 * | 7/2003 | Corzilius ............................ 74/5.5 |
| 6,647,182 B2 | 11/2003 | Sappey et al. |
| 6,754,412 B2 | 6/2004 | Huang et al. |
| 6,996,976 B2 * | 2/2006 | Rumminger et al. ........... 60/295 |
| 7,073,405 B2 * | 7/2006 | Rioux ........................... 73/866.5 |
| 7,248,755 B2 | 7/2007 | Sappey et al. |
| RE40,271 E | 4/2008 | Sappey et al. |
| 7,373,849 B2 * | 5/2008 | Lloyd et al. .................. 73/865.8 |
| 7,389,027 B2 | 6/2008 | Sappey et al. |
| 7,469,092 B2 | 12/2008 | Sappey et al. |
| 7,546,780 B2 * | 6/2009 | Santos ......................... 73/866.5 |
| 8,479,598 B2 * | 7/2013 | Vincent ....................... 73/866.5 |
| 2002/0096363 A1 * | 7/2002 | Evans et al. ..................... 175/41 |
| 2002/0141725 A1 | 10/2002 | Harr et al. |
| 2002/0181856 A1 | 12/2002 | Sappey et al. |
| 2005/0007450 A1 * | 1/2005 | Hill et al. ....................... 348/142 |
| 2006/0091310 A1 * | 5/2006 | Furry ............................. 250/330 |
| 2007/0263956 A1 | 11/2007 | Sappey et al. |
| 2008/0002186 A1 | 1/2008 | Masterson et al. |
| 2008/0074645 A1 | 3/2008 | Sappey et al. |
| 2008/0168851 A1 * | 7/2008 | Lopez et al. ................. 73/866.5 |
| 2008/0204720 A1 | 8/2008 | Howell |
| 2008/0239299 A1 * | 10/2008 | Cole ............................ 356/128 |
| 2008/0285916 A1 | 11/2008 | Sappey et al. |
| 2008/0289342 A1 | 11/2008 | Sappey et al. |
| 2010/0078561 A1 * | 4/2010 | Gorin ......................... 250/338.5 |
| 2010/0324437 A1 * | 12/2010 | Freeman et al. .............. 600/529 |
| 2011/0175604 A1 * | 7/2011 | Polzer et al. .................. 324/246 |

FOREIGN PATENT DOCUMENTS

EP  0689043 B1  12/1998

* cited by examiner

Primary Examiner — Lisa Caputo
Assistant Examiner — Punam Roy
(74) Attorney, Agent, or Firm — Eric Marich (57) ABSTRACT

Systems and methods are provided for stabilizing an emissions instrument. The emissions instrument includes an emissions sensor. The emissions sensor may be coupled to a gyro stabilizer. The gyro stabilizer may stabilize the emissions sensor, thus resulting in a more accurate and reliable emissions instrument.

18 Claims, 4 Drawing Sheets

SYSTEM AND METHOD FOR STABILIZING A SENSOR

BACKGROUND OF THE INVENTION

The subject matter disclosed herein relates to sensors, and more particularly, to systems and methods for stabilizing a sensor.

Sensing instruments such as fluid flow (e.g., gas, liquid) sensors and emissions sensors may be used to measure a variety of properties of fluid flows and emissions. Accordingly, the sensing instrument may be placed in situ in locations such as a turbine, a duct, or an exhaust stack. Unfortunately, many such locations are in difficult to access environments that include vibration and other unwanted movements. Such unwanted movements may result in the sensing instrument returning erroneous readings.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fluid measuring instrument (e.g., emissions instrument). The emission instrument includes an emission sensor and a gyro stabilizer coupled to the emission sensor.

In a second embodiment, a system includes a fluid measuring instrument. The fluid measuring instrument includes a mount capable of being mounted on wall, a probe extending from the mount, a sensor coupled to the probe, and a gyro stabilizer coupled to the probe. The probe is configured to pass through the wall into a fluid region.

In a third embodiment, a method includes obtaining a measurement of a fluid characteristic by using a fluid measuring instrument in a fluid region, and stabilizing the fluid measuring instrument with a gyro stabilizer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Aspects of the invention are directed to techniques and systems for stabilizing sensing instruments. Some sensors, such as optical sensors, force sensors, piezoelectric sensors, Hall effect sensors, electrodynamic sensors, flex sensors, and so forth, may monitor any number of parameters, including particulate count, temperature, flame presence, flashback/flame holding, lean blow-out (LBO) precursors, pressure, flow rate, fluctuations in time, variations in space, pollution levels, chemical composition, chemical concentrations, and so forth. Optical sensors may use a laser, infrared light, or some type of optical beam to monitor the aforementioned parameters. Indeed, optical sensors are capable of highly accurate measurements, in some cases, detecting chemical amounts as small as 1 part per million by volume (ppmv) flowing through, for example, an exhaust stack. However, some sensors may be intolerant of extraneous movement. For example, the optical beam or beams employed by the sensor may experience misalignments due to vibrations, temperature transients, and other movements. These misalignments may lead to incorrect measurements. Traditionally, the sensing instrument is remotely located in a stable environment, and a sample is extracted and delivered to the sensing instrument for analysis. The disclosed embodiments allow for the use of sensing instruments, such as optical sensors, in situ in environments subject to vibrations, temperature transients, and other unwanted mechanical movements. For example, the sensing instruments may be mounted in situ in turbine systems, boilers, furnaces, combustors, exhaust ports, exhaust stacks, vents, ducts, and so forth.

In certain embodiments, active stabilization techniques are used that employ devices, such as gyro stabilizers, global positioning systems (GPS), actuators and feedback loops, to actively counteract unwanted mechanical movements. In some embodiments, passive techniques such as dampening and structural techniques are used to further aid in the stabilization of the sensing instruments. Gyro stabilizers include a gyroscope having one or more gimbals (e.g., rings) positioned to surround a cylindrical or disc-like rotor. The gimbals allow the rotor to freely rotate around the gimbals' axes, and in embodiments having multiple gimbals (i.e., multiple axes), the rotor may attain multiple degrees (e.g., three) of rotational freedom. That is, the rotor may freely change its pitch, roll, or yaw. The rotor is spun around a spin axis by a motor to an operating velocity, in some cases, a velocity in excess of 10,000 rpm. The combination of the rotor's velocity and weight results in the rotor attaining a certain angular momentum. The angular momentum gives the gyroscope the capability of asserting a resistive force against certain movements. More specifically, a force applied to an input axis results in a corresponding force about an output (i.e., precession) axis that "rights" the gyroscope, maintaining the gyroscope's position and orientation. Gyro stabilizers may use one or more gyroscopes to provide forces that counteract unwanted mechanical movements. Indeed, any number and type of gyroscope embodiments such as single axis gyroscopes, two-axis gyroscopes, three-axis gyroscopes, and so on, may be used, resulting in a gyro stabilizer capable of stabilizing a fluid measuring instrument.

Figure 1:
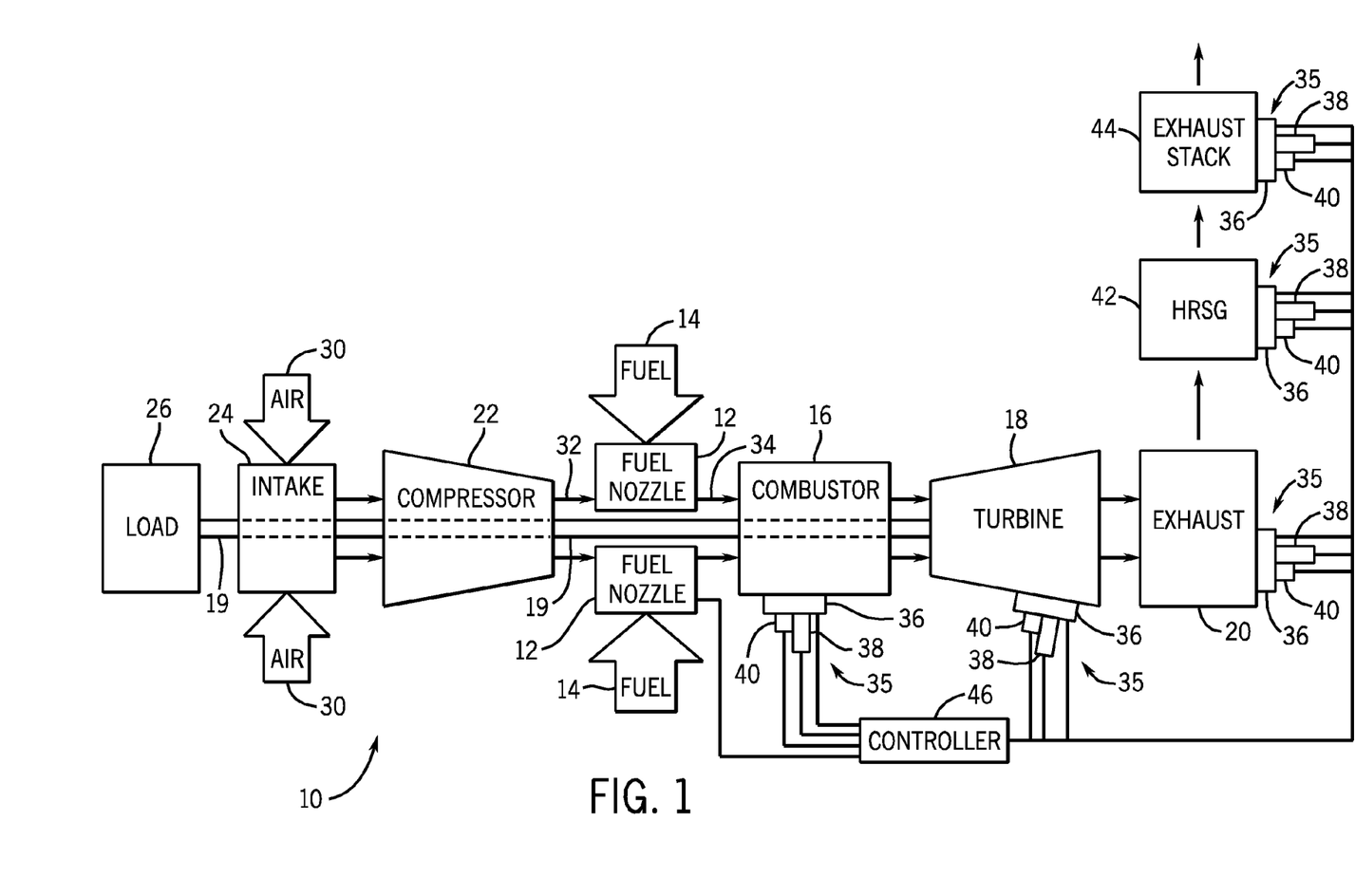
FIG. 1 is a block diagram of a turbine system including a stabilized fluid measuring instrument (e.g., emissions instrument) coupled to various components in accordance with certain embodiments of the present technique.

With the foregoing in mind and turning now to the drawings and referring first to FIG. 1, a block diagram of an embodiment of a gas turbine system 10 is illustrated. The gas turbine system 10 may be used, for example, in a power generation plant. The diagram includes a fuel nozzle 12, a fuel supply 14, and a combustor 16. As depicted, the fuel supply 14 routes a liquid fuel or gas fuel, such as natural gas, to the turbine system 10 through the fuel nozzle 12 into the combustor 16. The fuel nozzle 12 is configured to inject and mix the fuel with compressed air. The combustor 16 ignites and combusts the fuel-air mixture, and then passes hot pressurized exhaust gas into a turbine 18. The exhaust gas passes through turbine blades in the turbine 18, thereby driving the turbine 18 to rotate. In turn, the coupling between blades in the turbine 18 and a shaft 19 will cause the rotation of the shaft 19, which is also coupled to several components throughout the turbine system 10, as illustrated. Eventually, the exhaust of the combustion process may exit the turbine system 10 via an exhaust outlet 20.

In an embodiment of the turbine system 10, compressor vanes or blades are included as components of a compressor 22. Blades within the compressor 22 may be coupled to the shaft 19, and will rotate as the shaft 19 is driven to rotate by the turbine 18. The compressor 22 may intake air to the turbine system 10 via an air intake 24. Further, the shaft 19 may be coupled to a load 26, which may be powered via rotation of the shaft 19. As appreciated, the load 26 may be any suitable device that may generate power via the rotational output of the turbine system 10. For example, the load 26 may include an electrical generator, a propeller of an airplane, and so forth. The air intake 24 draws air 30 into the turbine system 10 via a suitable mechanism, such as a cold air intake, for subsequent mixture of air 30 with the fuel supply 14 via the fuel nozzle 12. As will be discussed in detail below, air 30 taken in by the turbine system 10 may be fed and compressed into pressurized air by rotating blades within the compressor 22. The pressurized air may then be fed into the fuel nozzle 12, as shown by arrow 32. The fuel nozzle 12 may then mix the pressurized air and fuel, shown by numeral 34, to produce an optimal mix ratio for combustion, e.g., a combustion that causes the fuel to more completely burn, so as not to waste fuel or cause excess emissions.

The turbine system 10 also includes a plurality fluid measuring instruments 35. In the illustrated embodiment, each fluid measuring instrument 35 includes a sensor 36, a gyro stabilizer 38 and a positioning mechanism 40. The illustrated fluid measuring instruments 35 are coupled to the combustor 16, the turbine 18, and the exhaust outlet 20. In certain embodiments where the turbine system 10 is a component of, for example, a power plant, the exhaust outlet 20 may be coupled to a heat recovery steam generator (HRSG) 42 to recover heat from the exhaust to generate steam for use in various applications such as a steam turbine. The HRSG 42 may in turn be coupled to an exhaust stack 44. The exhaust stack 44 is capable of redirecting the HRSG's exhaust gases into the atmosphere. Accordingly, the fluid measuring instruments 35 may also be coupled to the various power plant components, such as the HRSG 42 and the exhaust stack 44. Indeed, the disclosed embodiments can be used to monitor any number of components such as selective catalytic reduction (SCR) systems, vents, steam turbines, and so forth.

The sensor 36 includes embodiments that can be configured to obtain various fluid measurements. That is, certain sensor 36 embodiments may be used to measure properties of a gas, a gas-liquid mixture, or a liquid. For example, certain embodiments may monitor a gas flow from the combustor 16 to detect various emissions, temperature, pressure, flow rate, fluctuations in time, variations in space, and so forth. Other sensor 36 embodiments may monitor, for example, a gas flow through the turbine 18 to detect blade anomalies, rotational efficiency, and so forth. The sensor 36 embodiments may also be configured to obtain various emission measurements. In certain embodiments, emissions such as nitrogen oxides ($NO_x$), sulfur oxides ($SO_x$), ammonia ($NH_3$), carbon monoxide (CO), carbon dioxide ($CO_2$), hydrogen sulfide ($H_2S$), methane ($CH_4$), water, particulate matter, and so forth, may be monitored by the sensor 36. Indeed, any number of fluid and/or emission measurements may be monitored by the sensor 36. In certain embodiments, the sensor 36 may include optical sensing techniques as described in more detail below with respect to FIG. 2. In some embodiments, the sensor 36 may include a laser spectrography sensor 36 as described in more detail below with respect to FIG. 3. In other embodiments, sensor 36 may include cross-duct techniques as described in more detail below with respect to FIG. 4.

A gyro stabilizer 38 is coupled to the sensor 36 and is capable of stabilizing the sensor 36 through a wide range of unwanted mechanical oscillations and other movements. In addition to active damping of the sensor 36 by using the gyro stabilizer 38, passive damping may also be employed. In passive damping, the sensor 36 may include, for example, a viscoelastic sensor pad attached to the sensor 36 that is capable of absorbing vibrations. Tuned passive dampers may also be used that are capable of removing unwanted vibrations at a specific frequency or frequency range. Certain embodiments may provide multiple gyro stabilizers 38 to stabilize each sensor 36. For example, one gyro stabilizer 38 may be used to stabilize vibration in one plane, while a second gyro stabilizer 38 may be used to stabilize vibration in a different plane. Other embodiments may provide for a single gyro stabilizer 38 that is capable of stabilizing vibration in any number of planes (e.g., 1, 2, 3, 4, 5, 6, 7, 8, 9, 10). Indeed, by the use of gyro stabilizers 38 embodiments may result in a highly stable sensor 36, increasing sensitivity, accuracy, precision, and reliability of emissions and fluid property monitoring.

A controller 46 is communicatively coupled to the sensor 36, the gyro stabilizer 38, the positioning mechanism 40 and the fuel nozzle 12. In certain embodiments, the controller 46 may also be communicatively coupled to inlet guide vanes, an inlet bleed heat unit and/or a water injection system. The sensor 36 is configured to transmit measurements of the interior of the combustor 16, the turbine 18, the exhaust port 20, the HRSG 42, and the exhaust stack 44, to the controller 46. The controller 46 may, in turn, analyze the measurements and determine whether each component is functioning within operational parameters. For example, the controller 46 may be configured to detect improper fuel mixture, high temperature, thermal barrier coating (TBC) detachment, flame presence, excessive combustor oscillations, LBO precursors, flashback/flame holding, fuel mal-distribution, changes to fuel composition, particulate count, chemical composition, and/or chemical concentrations, turbine blade clearance or rub, among other component conditions. Alternatively, the sensor 36 may include circuitry configured to detect any of the above conditions and transmit the detected condition to the controller 46. Furthermore, the controller 46 may be configured to adjust fuel flow, inlet guide vane angle, inlet heat, a water injection system, carbon sequestration parameters, and so forth, based on an identified condition. For example, the controller 46 may adjust fuel flow into combustor 16 and/or fuel distribution between the fuel nozzles 12. In addition, the controller 46 may set a warning indicator to inform an operator of a detected condition. For example, alerts can be issued based on certain levels of $NO_x$, $SO_x$, $NH_3$, $CO$, $CO_2$, $H_2S$, $CH_4$, water, particulate matter, and so forth.

The controller 46 may also adjust the position of the sensor 36 by instructing the positioning mechanism 40 to shift, rotate and/or translate the sensor 36. The positioning mechanism 40 may include actuators, limit switches, servos, and/or encoder motors that aid in repositioning the sensor 36. Accordingly, the sensor 36 can be repositioned and/or calibrated by the controller 46 as appropriate. In certain embodiments, GPS may be used to aid in aligning the sensor 36 as describe in more detail below. Maintenance activities such as re-alignment of the sensor 36 are greatly improved due to the use of the disclosed embodiments such as positioning mechanism 40. Indeed, the positioning mechanism 40 may be employed such that the sensor 36 is periodically checked and re-aligned automatically.

Figure 2:
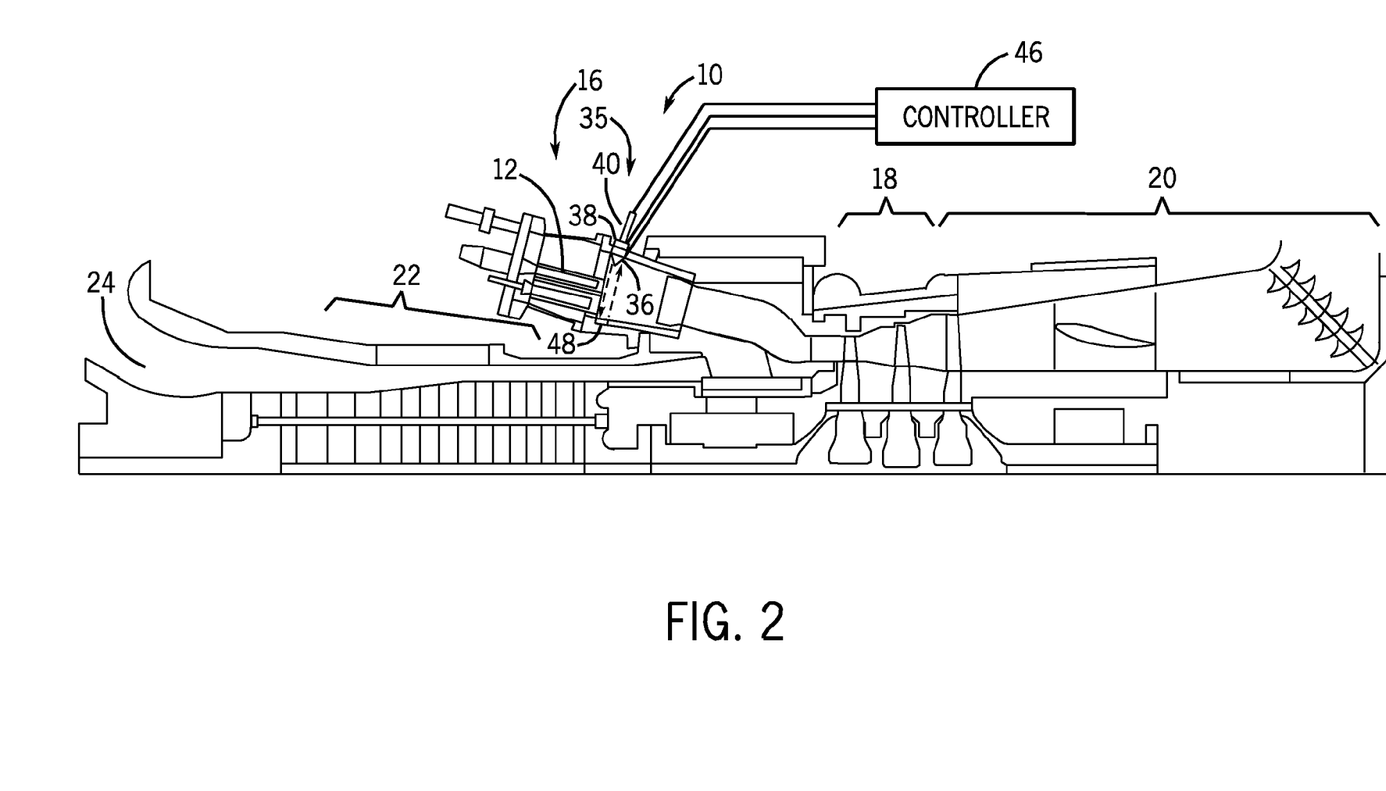
FIG. 2 is a cutaway side view of the turbine system, as shown in FIG. 1, in accordance with certain embodiments of the present technique.

FIG. 2 is a cutaway side view of an embodiment of the turbine system 10, including the fluid measuring instrument 35. As depicted, the embodiment includes the compressor 22, which is coupled to an annular array of combustors 16. For example, six combustors 16 are located in the illustrated turbine system 10. Each combustor 16 includes one or more fuel nozzles 12, which feed an air-fuel mixture to a combustion zone located within each combustor 16. For example, each combustor 16 may include 1, 2, 3, 4, 5, 6, 7, 8, 9, 10, or more fuel nozzles 12 in an annular or other suitable arrangement. Combustion of the air-fuel mixture within the combustors 16 will cause blades within the turbine 18 to rotate as exhaust gas passes toward the exhaust outlet 20.

FIG. 2 shows a possible location for the fluid measuring instrument 35 relative to each combustor 16. As illustrated, the sensor 36 of the fluid instrument 35 is coupled to the combustor 16. The sensor 36 may include optical embodiments that use features such as lasers and/or other light beams (e.g., infrared light, near infrared light). Furthermore, in this embodiment, the sensor 36 is located downstream of the fuel nozzles 12, and oriented substantially perpendicular to a flow path of combustion gases. This configuration may enable the sensor 36 to capture measurements of a gas flow combusted downstream from the fuel nozzles 12. Electronic signals indicative of these measurements may be transmitted to the controller 46 for analysis. If the controller 46 determines that the combustor 16 is not performing within operational parameters, the controller 46 may adjust fuel flow to the fuel nozzles 12 to compensate. Alternatively, the controller 46 may adjust inlet guide vane angle, inlet heat, a water injection, or other parameters.

In the embodiment depicted in FIG. 2, each combustor 16 includes a single fluid measuring instrument 35. In this embodiment, the gyro stabilizer 38 of the fluid instrument 35 may be capable of stabilizing the sensor 36 through a wide range of unwanted mechanical oscillations and other movements of the combustor 16. In addition to active damping of the sensor 36 by using the gyro stabilizer 38, passive damping may also be employed as mentioned above with respect to FIG. 1, including viscoelastic dampers and tuned dampers. Other embodiments may employ multiple fluid measuring instruments 35 per combustor 16. In such embodiments, the fluid measuring instruments 35 may be disposed adjacent to each combustor 16 at various locations. For example, the fluid measuring instruments 35 may be disposed radially around the circumference and/or along the longitudinal axis of each combustor 16. Similarly, multiple gyro stabilizers 38 may be used to stabilize each of the sensors 36 that may be included in each fluid measuring instrument 35. For example, one gyro stabilizer may be used to stabilize vibration in one plane while a second gyro stabilizer 38 may be used to stabilize vibration in a different plane of the combustor 16. Any number of planes may be stabilized by using multi-gyro stabilizer embodiments. Accordingly the stability of the sensor 36 of the fluid measuring instrument 35 may be enhanced, providing for a very stable sensor 36, resulting in increased sensitivity, accuracy, precision, and reliability of emissions and fluid property monitoring.

In certain embodiments such as that illustrated in FIG. 2, the sensor 36 is an optical reflectance sensor 36 that can emit a beam (e.g., laser, infrared light, near infrared light) to a reflector 48 to facilitate monitoring of the combustor interior. The beam may traverse the entirety of the combustor interior, impinge on the reflector 48, and reflect back into the sensor 36. The sensor 36 may then analyze the beam to detect a series of measurements indicative of conditions in the interior of the combustor 16. In other embodiments, the sensor 36 may include other optical features such as laser spectrography. Indeed, any number and type of emission sensor features may be used in the disclosed sensors 36. One or more gyro stabilizers 38 may be coupled to the sensor 36 to aid in stabilizing the sensor 36 and in aiming the resulting beam. The use of the gyro stabilizers 38 prevents unwanted vibration and other extraneous mechanical movements from affecting the sensor 36.

The sensor 36 of the fluid measuring instrument 35 is communicatively coupled to the controller 46 and configured to send a signal indicative of one or more measurements. The controller 46 is configured to analyze these measurements and detect, for example, flame abnormalities, emissions, and/or structural defects within each combustor 16. Furthermore, in embodiments employing multiple fluid measuring instruments 35 per combustor 16, the controller 46 may be configured to create a composite (e.g., multi-variable) matrix of measurements of the combustor interior. A composite matrix of measurements may facilitate detection of flame and/or structural irregularities throughout the combustor 16. Additionally, the controller 46 may be configured to use the positioning mechanism 40 to realign the sensor 36. Indeed, the controller 46 may actively align the sensor 36 and achieve a very precise alignment through the use of alignment indicia such as beam reflectance characteristics, visual alignment markings, electronic alignment markings (e.g., RFID), global positioning system (GPS) location information, and so forth.

The controller 46 may also be configured to compare measurements of individual and/or multiple combustor interiors to identify undesirable combustor operation. For example, if the fuel mixture of one area of the combustor 16 substantially deviates from a combustor average, then the controller 46 may adjust fuel flow to the anomalous area to compensate. Similarly, the temperature of each flame may be compared to average flame temperature across the entire turbine system 10. As previously discussed, the turbine system 10 includes multiple combustors 16. By comparing flame temperature across the entire turbine system 10, the controller 46 may identify particular flames that are burning at undesirable temperatures. Alternatively, the controller 46 may contain a database of proper flame temperatures for particular turbine configurations and/or operating conditions. The controller 46 may then adjust fuel flow to the individual fuel nozzles 12 if flame temperature substantially deviates from the temperatures stored within this database. Similarly the controller 46 may adjust certain parameters such as the fuel mixture, to reduce emissions.

Figure 3:
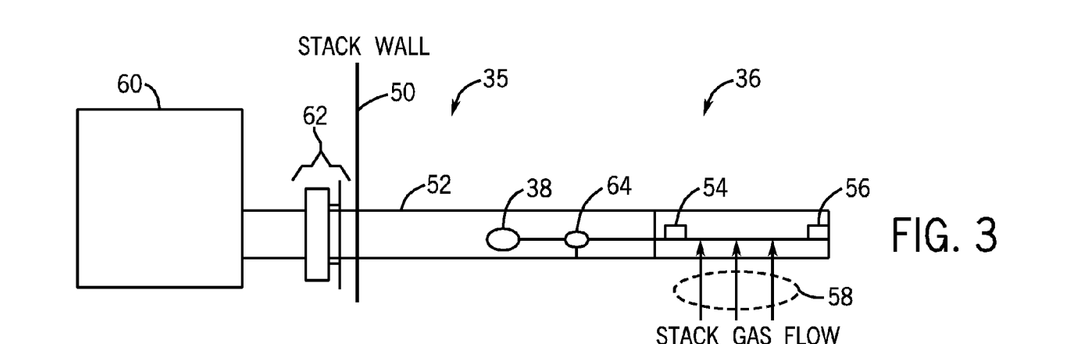
FIG. 3 is a side view of the stabilized fluid measuring instrument coupled to a stack wall in accordance with certain embodiments of the present technique.

FIG. 3 illustrates an embodiment of the fluid measuring instrument 35 disposed in an exhaust stack wall 50. Although the illustrated embodiment shows a lateral placement of the fluid measuring instrument 35 in the stack wall 50, other placements may include a vertical placement, an angled placement, or any other orientation. In the illustrated embodiment, the fluid measuring instrument 35 includes a laser spectroscopy sensor 36 that uses laser spectroscopy techniques (e.g., quantum cascade lasers, tunable lasers) to measure the properties of a fluid region. The laser spectroscopy sensor 36 includes a bore (i.e. probe) 52 that is positioned in situ so as to sample, for example, the interior of the stack wall 50. The bore 52 includes a set of optical elements, such as an optical element 54 and an optical element 56, useful in monitoring a gas flow 58. The gas flow 58 may flow through the sensing components of the fluid measuring instrument 35 through openings in the walls of the bore 52. The laser spectroscopy sensor 36 may operate by including a laser (e.g., quantum cascade laser, tunable laser) that may be pulsed to emit at different frequencies and a photodetector that can detect radiation transmitted through, for example, a gas flow 58. Molecules in the gas flow 58 absorb radiation at certain preferential frequencies and in turn, transmit the radiation. The photodetector can distinguish different absorption spectral lines. By comparing the frequency of the current laser emission with the corresponding absorption spectral lines it is possible to determine the chemical makeup and the chemical concentrations in the gas flow 58. The detected radiation may be used to derive the presence and concentration of emissions such as $NO_x$, $SO_x$, $NH_3$, CO, $CO_2$, $H_2S$, $CH_4$, water, and so forth. Accordingly, the optical element 54 may be a laser and the optical element 56 may be a photodetector. In other sensor 36 embodiments, optical elements may include reflectors, minors, prisms, and so forth disposed inside of the bore 52. Indeed, various optical elements may be disposed inside of the bore 52 so as to measure emissions and other fluid flow properties of the gas flow 58.

The sensor 36 may also include an electronics module 60 that is capable of communicatively coupling with the optical elements 54, 56, for example, to drive the laser and to receive and process signals from the photodetector. A flange assembly (i.e., mount) 62 may be used to couple the bore 52 to the stack wall 50. The same flange assembly 62 may also be used to couple the electronics module 60 to the bore 52. Accordingly, the flange assembly 62 holds the sensor 36 within the stack wall 50 to sample the gas flow 58. The gas flow 58 may cause vibrations and other unwanted mechanical movements of objects placed inside of the stack wall 50, such as the bore 52 and optical elements 54 and 56. Such movements may tend to interfere with the proper functioning of the sensor 36, for example, by changing the path length or direction of the laser beam and/or the alignment of the optical elements 54, 56 present in the bore 52. Such interference would result in measurement errors and other discrepancies. Accordingly, the bore 52 includes one or more gyro stabilizers 38 to reduce or eliminate the impact of destabilizing movements or vibrations on the optical elements 54 and 56.

In the illustrated embodiment, the gyro stabilizer 38 may actively dampen vibrations and other unwanted mechanical movements of the bore 52 by applying a resistive force through, for example, gyroscopic embodiments. That is, unwanted mechanical movements can be countered by exerting a gyroscopic force that cancels the unwanted mechanical movement. Viscoelastic pads can also be included to aid in stabilizing the optical elements 54 and 56 and the bore 52 at the flange assembly 62. Tuned passive dampers may also be used that are capable of removing unwanted vibrations at one or more specific frequencies or frequency ranges. A weight 64 may also be included in the bore 52 so as to aid the balance of the various sensor embodiments included in the bore 52 and the gyro stabilizer 38. While the depicted embodiment shows a single gyro stabilizer 38 and weight 64, certain embodiments may include multiple gyro stabilizers 38 and weights 64 to enhance the stability of the bore 52 and optical elements 54 and 56. Such dampening capabilities allow the optics present in the bore 52 to continue to operate within normal parameters even while being placed inside, for example, the exhaust wall 50.

Figure 4:
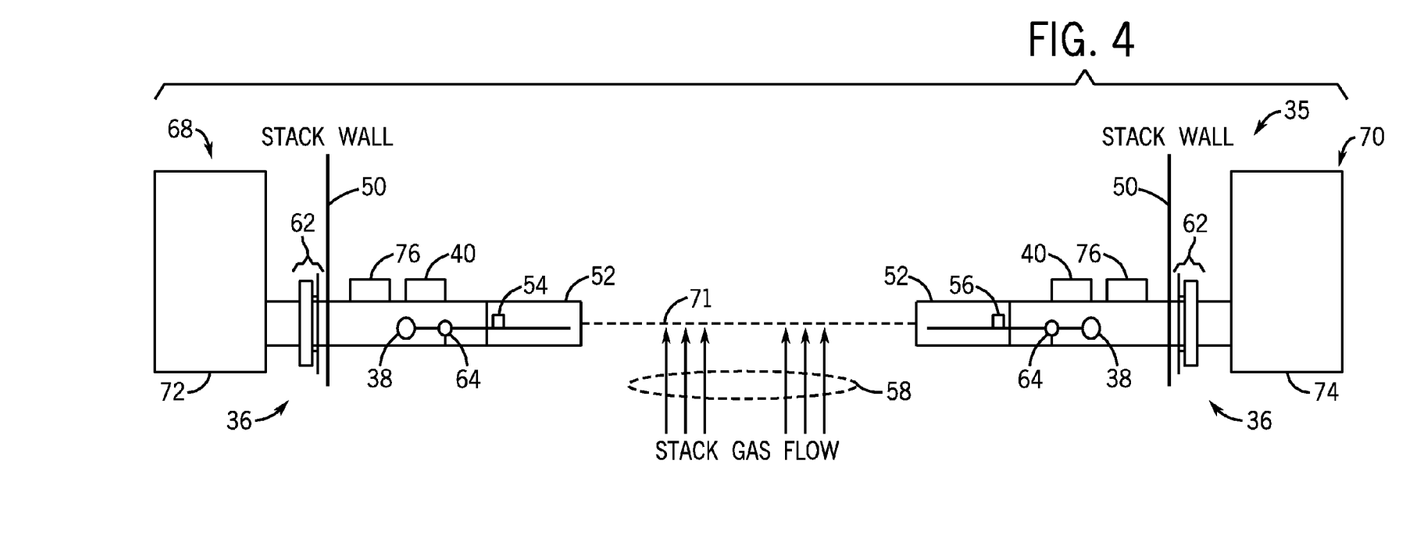
FIG. 4 is a side view of a cross-duct stabilized fluid measuring instrument in accordance with certain embodiments of the present technique.

FIG. 4 illustrates a cross-duct embodiment of the fluid measuring instrument 35 having sensors 36 with a sensor emitter 68 and a sensor detector 70. As illustrated, the sensor emitter 68 is placed in the left stack wall 50 opposite from and facing the sensor detector 70 in the right stack wall 50. The bores 52 of the sensor emitter 68 and the sensor detector 70 are aligned such that they share the same bore axis 71. That is, a beam exiting the bore 52 of the sensor emitter 68 is capable of entering the bore 52 of the sensor detector 70 along the axis 71. Accordingly, a beam, such as a laser beam, emitted from the sensor emitter 68, transmits the laser energy between optical transmitter 54 and optical receiver 56 in single or multiple passes (e.g., cycles), causing radiation to radiate from the gas flow 58 for detection by the sensor detector 70. In certain embodiments, components 54 and 56 may include simple components such as polished metal blocks or other material used for optical reflection. Components 54 and 56 may also include more complex components, such as electronic components capable of emitting and receiving signals. An electronics module 72 may include electronics used to generate the laser beam, while an electronics module 74 may include electronics used to detect the radiation emitted by the gas flow 58. The detected radiation may be used to derive the presence and concentration of emissions such as $NO_x$, $SO_x$, $NH_3$, CO, $CO_2$, $H_2S$, $CH_4$, water, and so forth. Indeed, any number and type of emissions and fluid flow properties of the gas flow 58 may be measured by the fluid measuring instrument 35.

In certain embodiments, a single electronic module, such as electronics module 72, may house all or substantially all of the electronics for the fluid measuring instrument 35. In these embodiments, the electronics module 74 is not used and is not attached to the right stack wall 50. The remaining single electronics module, such as electronic module 74, is capable of communicatively coupling with all components of the fluid measuring instrument 35, for example, to generate the laser beam and detect the radiation emitted by the gas flow 58. Indeed, the single electronic module may control all aspects of the fluid measuring instrument 35, including alignment, stabilization, measurement, and so forth. In other embodiments, a plurality of electronics modules, such as electronics modules 72, 74, may be used. Indeed, any number of electronics modules (e.g., 1, 2, 3, 4, 5, 6, 7, 8, 9, 10) may be used to house the various electronic components of the fluid measuring instrument 35.

The gas flow 58 may cause vibrations, and other unwanted mechanical movement, to objects placed inside the stack walls 50, such as the bores 52 of the sensor emitter 68 of the sensor detector 70. Such unwanted movements may cause the misalignment of the optical elements 54, 56. Accordingly, one or more gyro stabilizers 38 may be placed inside each bore 52 of the sensor emitter 68 and the sensor detector 70. As mentioned above with respect to FIG. 3, the gyro stabilizer 38 may actively dampen vibrations, and other unwanted mechanical movements of each bore 52 by applying a resistive force through, for example, gyroscopic embodiments. Viscoelastic pads may be included to aid in stabilizing the optical elements 54 and 56 and the bores 52 at the flange assemblies 62. Tuned passive dampers may also be used that are capable of removing unwanted vibrations at a specific frequency. Additionally, the weight 64 may also be included in each bore 52 so as to aid the balancing of the various sensor embodiments included in each bore 52 and the gyro stabilizers 38. While the depicted embodiment shows a single gyro stabilizer 38 and weight 64 in each bore 52, certain embodiments may include multiple gyro stabilizers 38 and weights 64 to enhance the stability of the bores 52.

Cross-duct embodiments of the fluid measuring instrument 35 (e.g., opposing sensors 36) may also experience misalignment between the opposing bores 52 due to, for example, expansion and contraction of the bores 52 through thermal transients. Accordingly, the controller 46, a GPS module 76 and the mechanical positioner 40 may be used to aid in aligning and calibrating the fluid measuring instrument 35. In the depicted embodiment, the GPS module 76 and the mechanical positioner 40 are placed on each of the bores 52 of the sensor emitter 68 and the sensor detector 70. The GPS module 76 is capable of determining a precise location (e.g., longitude, latitude) and altitude of each bore 52. The location and altitude of each of the bores 52 may then be used, for example, by the controller 46 (e.g., position controller) to determine an alignment factor. The alignment factor may then be used by the mechanical positioners 40 to reposition and align the bore axis 71 shared by each of the bores 52. Indeed, by using the GPS module 76 and the mechanical positioner 40 it may be possible to realize very precise remote alignments between the two bores 52, resulting in increased sensitivity, accuracy, precision, and reliability of emissions and fluid property monitoring. Further, maintenance of the fluid measuring instrument 35 is reduced because placement and alignment problems of the fluid measuring instrument 35 are minimized and can be performed remotely. Indeed, remote alignment may be performed without taking the sensors offline or removing them.

Figure 5:
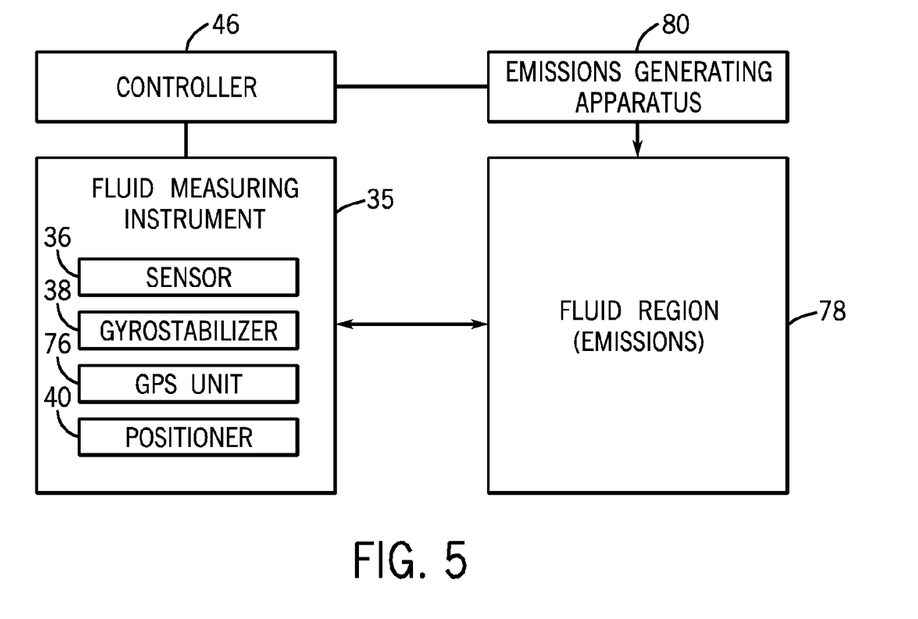
FIG. 5 is a block diagram of a controller communicatively coupled to an emissions generating apparatus and a stabilized fluid measuring instrument in accordance with certain embodiments of the present technique.

FIG. 5 depicts a block diagram of embodiments of the controller 46 and the fluid measuring instrument 35 being used to measure properties of a fluid region 78. In the depicted embodiment, the controller 46 is communicatively coupled to the fluid measuring instrument 35 and an emissions generating apparatus 80. In certain embodiments, the emissions generating apparatus 80 may include, for example, the turbine system 10 depicted in FIG. 1. The controller 46 may direct operations of the emissions generating apparatus 80. For example, in embodiments where the emissions generating apparatus 80 includes the turbine system 10, the controller 46 may adjust the fuel flow rate into the combustor 16. The combustor 16 may combust the fuel mixture, resulting in a fluid region 78, which includes a hot pressurized gas. The fluid measuring instrument 35 may measure certain properties of the fluid region 78 through the use of, for example, one or more embodiments of sensors 36. The sensor 36 may measure a wide variety of fluid region properties, such as chemical compositions, chemical concentrations (e.g., ppmv), temperature, particulate mater, and so forth.

The illustrated fluid measuring instrument 35 includes the sensor 36, the gyro stabilizer 38, the GPS module 76, and the positioner 40. The gyro stabilizer 38 provides for active stabilization and is capable of maintaining a position and an orientation for the fluid measuring instrument 35 by dampening vibrations or other unwanted mechanical movements. The GPS module 76 is capable of providing for precise location and altitude information that may be used to realign the fluid measuring instrument 76 through the use of, for example, the positioner 40. Additionally, the GPS module 76 may be used to correlate measured data with the data's location information so as to precisely measure various subregions of fluid region 78. By combining the gyro stabilizer 38, the GPS module 76, and the positioner 40, the fluid measuring instrument 35 is capable of maintaining a stable, aligned position even when placed in situ in environments experiencing significant vibrations or other mechanical movements. Indeed, the techniques disclosed herein allow for a multitude of in situ placements such as those described in more detail with respect to FIG. 6 below.

Figure 6:
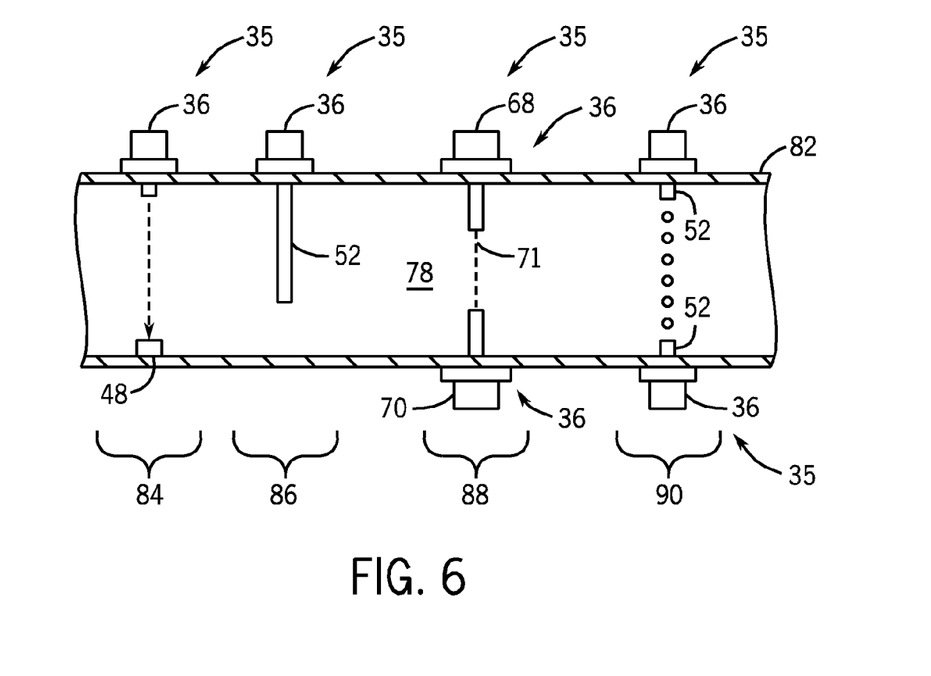
FIG. 6 is a cutaway side view of a duct including several stabilized fluid measuring instruments in accordance with certain embodiments of the present technique.

FIG. 6 depicts the in situ placement of several types of fluid measuring instruments 35 positioned to measure properties of the fluid region 78 inside of a duct 82 at areas 84, 86, 88, and 90. In the depicted embodiment, the area (i.e., sensing region) 84 of the duct 82 is monitored by the single fluid measuring instrument 35, which includes an optical reflectance sensor 36. The sensor 36 of the area 84 is capable of emitting a beam into the reflector 48, which may then be analyzed by the sensor 36 to derive a set of measurements of the area 84 such as temperature, gas flow speed, and so forth. The area 86 of the duct 82 is monitored by another single fluid measuring instrument 35, which includes a laser spectrography sensor 36. In this embodiment, all the optics for laser spectrography are included in the bore 52 of the sensor 36. Accordingly, different fluid properties of the area 86 may be monitored by the optics in the bore 52, including chemical compositions and chemical concentrations.

The area 88 is monitored by a single cross-duct fluid measuring instrument 35. As mentioned previously, the cross-duct fluid measuring instrument 35 includes the cross-duct sensors 36 having the sensor emitter 68 and the sensor detector 70. The sensor emitter 68 and the sensor detector 70 are aligned such that they share the same bore axis 71. In this embodiment, the area 88 is monitored by having a laser emitted from the sensor emitter 68 radiate the gas in the area 88 with the corresponding radiation being detected by the sensor detector 70. The fluid measuring instrument 35 may then analyze the detected radiation to determine, for example, chemical compositions and chemical concentrations of the area 88.

The area 90 is monitored by a plurality of fluid measuring instruments 35. In the depicted embodiment, the fluid measuring instruments 35 are disposed circumferentially around the duct 82. The fluid measuring instruments 35 include laser spectrography sensor 36 embodiments, which have the optical elements disposed inside of the bore 52. In the depicted embodiment, the bores 52 of the sensors 36 are of varying lengths. Accordingly, each sensor 36 may sample a different region of the area 90 based on the bore length. Indeed, by using multiple fluid measuring instruments 35 and multiple placements of the fluid measuring instruments 35, a composite matrix of measurements of the different regions and areas 84, 86, 88, and 90 may be created that is capable of highly accurate and sensitive measurements of the fluid region 78 of the duct 82.

Technical effects of the invention include the ability to stabilize a fluid measuring instrument so as to increase the accuracy, precision, and sensitivity of the resulting measurements. Location information (e.g., GPS) may be used for alignment as well as for mapping sensor data to accurate GPS position. Other effects include the ability to quickly and easily align and calibrate the fluid measuring instrument. Further effects include the reduction in the time and expense of maintaining the fluid measuring instrument.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a first emissions instrument comprising a first emissions sensor and a first gyro stabilizer coupled to at least a portion of the first emissions sensor; and
    a first optical element coupled to the first gyro stabilizer;
    wherein the first emissions instrument comprises a second emissions sensor coupled to the first gyro stabilizer, wherein the second emissions sensor comprises a second optical element offset from the first optical element about a sensing region.

2. The system of claim 1, wherein the first emissions sensor comprises a laser.

3. The system of claim 1, comprising a power plant component, an exhaust duct, a boiler, an engine, a turbine, a combustor, a vent, or any combination thereof, having the first emissions instrument.

4. The system of claim 1, wherein the first emissions instrument comprises a global positioning system (GPS) unit.

5. The system of claim 4, comprising a position controller coupled to the GPS unit and a positioner.

6. The system of claim 1, comprising a controller coupled to the first emissions instrument and an emissions generating apparatus.

7. A system, comprising:
    a first emissions instrument comprising a first emissions sensor and a first gyro stabilizer coupled to at least a portion of the first emissions sensor;
    a first optical element coupled to the first gyro stabilizer; and
    a second emissions instrument separate from the first emissions instrument, wherein the second emissions instrument comprises a second emissions sensor coupled to a second gyro stabilizer, and the second emissions sensor comprises a second optical element offset from the first optical element about a sensing region.

8. The system of claim 7, comprising a power plant component, an exhaust duct, a boiler, an engine, a turbine, a combustor, a vent, or any combination thereof, having the first emissions instrument.

9. The system of claim 7, wherein the first emissions instrument comprises a global positioning system (GPS) unit.

10. The system of claim 7, comprising a position controller coupled to the GPS unit and a positioner.

11. The system of claim 7, comprising a controller coupled to the first emissions instrument and an emissions generating apparatus.

12. A system, comprising:
    a first fluid measuring instrument, comprising a first mount configured to mount to a first wall;
    a first probe extending from the first mount, wherein the first probe is configured to pass through the first wall into a fluid region;
    a first sensor coupled to the first probe; and
    a first gyro stabilizer coupled to the first probe,
    wherein the first probe comprises a first bore surrounding the first sensor and the first gyro stabilizer.

13. The system of claim 12, wherein the first bore has a first open end, and the first sensor comprises a first light source, a first optical element, or a combination thereof, configured to transmit or receive light through the first open end.

14. The system of claim 12, wherein the first instrument comprises a second sensor coupled to the first probe, and the first bore surrounds the second sensor.

15. The system of claim 14, wherein the first and second sensors are offset from one another about a fluid sensing region, and the first bore comprises at least one opening about the fluid sensing region.

16. A system, comprising:
    a first fluid measuring instrument, comprising a first mount configured to mount to a first wall;
    a first probe extending from the first mount, wherein the first probe is configured to pass through the first wall into a fluid region;
    a first sensor coupled to the first probe;
    a first gyro stabilizer coupled to the first probe; and
    a second fluid measuring instrument separate from the first fluid measuring instrument, wherein the second fluid measuring instrument comprises a second mount configured to mount to a second wall, a second probe extending from the second mount, a second sensor coupled to the second probe, and a second gyro stabilizer coupled to the second probe, wherein the second probe is configured to pass through the second wall into the fluid region, and wherein the first and second sensors are offset from one another about a fluid sensing region.

17. The system of claim 16, wherein the first wall and the second wall surround a portion of a duct or a vent and the first fluid measuring instrument is configured to measure impurities or pollutants in the fluid region inside the duct or vent.

18. A system, comprising:
    a first fluid measuring instrument, comprising a first mount configured to mount to a first wall;
    a first probe extending from the first mount, wherein the first probe is configured to pass through the first wall into a fluid region;
    a first sensor coupled to the first probe; and
    a first gyro stabilizer coupled to the first probe,
    wherein the first fluid measuring instrument comprises a global positioning system (GPS) unit.

* * * * *